United States Patent
Kim

[11] Patent Number: 6,044,091
[45] Date of Patent: Mar. 28, 2000

[54] METHOD AND APPARATUS FOR SCHEDULING CELLS BASED ON PRE-SYNCHRONIZED FRAMES

[75] Inventor: Deog-Nyoun Kim, Seoul, Rep. of Korea

[73] Assignee: Daewoo Electronics Co., Ltd., Rep. of Korea

[21] Appl. No.: 08/970,646

[22] Filed: Nov. 14, 1997

[30] Foreign Application Priority Data

Dec. 26, 1996 [KR] Rep. of Korea ......................... 96-72055
Dec. 26, 1996 [KR] Rep. of Korea ......................... 96-72062

[51] Int. Cl.[7] .................................................. H04J 3/06
[52] U.S. Cl. ............................................ 370/508; 370/519
[58] Field of Search ................................. 370/231, 230, 370/508, 509, 519, 516, 517, 395; 375/354, 355, 356, 363

[56] References Cited

U.S. PATENT DOCUMENTS

| | | | |
|---|---|---|---|
| 5,043,982 | 8/1991 | Werner | 370/519 |
| 5,050,161 | 9/1991 | Golestani | 370/230 |
| 5,050,162 | 9/1991 | Golestani | 370/235 |
| 5,539,739 | 7/1996 | Dike | 370/517 |
| 5,748,614 | 5/1998 | Wallmeier | 370/235 |
| 5,796,719 | 8/1998 | Peris | 370/231 |

FOREIGN PATENT DOCUMENTS 2293720  4/1996  United Kingdom.
2316270  2/1998  United Kingdom.

*Primary Examiner*—Ajit Patel
*Assistant Examiner*—Ricardo M. Pizarro
*Attorney, Agent, or Firm*—Anderson Kill & Olick

[57] ABSTRACT

A method for scheduling a plurality of cells of a call via a connection linking a multiplicity of nodes which include a source node and a destination node is provided. A frame counter which counts down the time slots of each frame to be reset to a frame size is assigned to each node of each connection. All the frame counters at all the nodes are pre-synchronized on a connection basis based on propagation delays and delay bounds so that each upstream count of the frame counter in the upstream node is previously correlated to a downstream count of the frame counter in the downstream node. So the eligible time of a cell at each node can be determined without delivering scheduling information from an upstream node to a downstream node. The synchronized queue for each connection includes logically separated two FIFO queues so that one FIFO queue stores an eligible cell ready to be scheduled for transmission while the other FIFO queue stores non-eligible cell that must be jitter-controlled until the end of the frame size.

8 Claims, 10 Drawing Sheets

6,044,091

METHOD AND APPARATUS FOR SCHEDULING CELLS BASED ON PRE-SYNCHRONIZED FRAMES

FIELD OF THE INVENTION

The present invention relates to a method and apparatus for scheduling cells with real-time services in an ATM network; and, more particularly, to a method and apparatus capable of providing a guaranteed end-to-end delay and delay-jitter without transmitting the scheduling information from one node to another based on pre-synchronized frames.

DESCRIPTION OF THE PRIOR ART

B-ISDN(broadband integrated service digital network) is a digital network which provides various kinds of services, such as continuous real-time services and congregative data services by connecting concentrated or distributed users with servers based on a broadband transmission and switching technique. For B-ISDN, an ATM(asynchronous transfer mode) technique is adopted to transmit information across a user-network interface wherein the ATM technique is a packet-based asynchronous time-division multiplexing technique that takes advantage of both conventional circuit-switching and packet-switching together and is capable of processing various services.

A future ATM network will require unpredictably tremendous services which may have much different traffic characteristics quantitatively as well as qualitatively from those of the current services. The services will be required to guarantee throughput, delay, jitter, and loss rate; and as the real-time services, such as voice or video, will become major services of broadband networks, the requirements on the delay and jitter in the services will become more stringent too. Since real-time information is considered as lost if it is not transferred within a time limit, it becomes more and more important to effectively satisfy the requirements on the delay and jitter.

A number of works have been reported on the queuing strategy which can support real-time communication services in high-speed packet switched networks. They can be classified into a work-conserving and a non-work-conserving strategies. In the network with the work-conserving service disciplines, network load fluctuation at previous nodes may distort the traffic pattern of a connection and cause an instantaneous rate increase at some nodes even when the connection satisfies the user-specified rate constraint at the entrance to the network. The burstiness of traffic in a connection usually accumulates at each hop along a connection path from a source node to a destination node, thereby requiring more resources for the latter-located nodes.

In order to address this problem, several non-work-conserving packet service disciplines have been proposed that can possibly regulate the packet jitter at intermediate nodes to prevent the traffic becoming burstier. A hierarchical round robin (HRR) and a stop-and-go technique are the typical examples thereof, which divide the time axis into frames of a constant length and allocate a certain number of segmented frames to each connection. In this framing strategy, packet service is allowed only for the allocated time frame and thus can possibly bound the delay jitter. However, it has an intrinsic coupling problem between bandwidth granularity and delay bounds which may lead to low bandwidth utilization. A jitter earliest-due-date (jitter- EDD) and a rate-controlled static priority (RCSP) techniques control the packet jitter on a per packet basis, but require to compute the leading time of each packet in each node and to stamp it on the header for transmission to the next node.

Referring to FIG. 1, there is illustrated the conventional jitter earliest-due-date technique, which shows the progress of a cell k through two neighboring nodes, i and i+1 of a connection j, wherein the node number i, the connection number j and the cell number k being positive integers, respectively. The cell k becomes eligible for transmission after an eligible time $ET_{ij}^k$ at the node i of a connection j and must be served before a deadline $DL_{ij}^k$ at the node i, wherein the deadline $DL_{ij}^k$ is calculated as a sum of the eligible time $ET_{ij}^k$ plus a delay bound $d_{ij}$; and the delay bound $d_{ij}$ for the node i of the connection j is predefined at the call set-up stage.

In accordance with a predetermined allocation discipline of a scheduler, no sooner has the cell k been stamped with a pre-ahead $PA_{ij}^k$ than the cell k is actually served at a service time $ST_{ij}^k$ before its deadline $DL_{ij}^k$ from the node i to the node i+1, wherein the pre-ahead $PA_{ij}^k$ is calculated by taking a time difference between its deadline $DL_{ij}^k$ and the service time $ST_{ij}^k$ at the node i. After a propagation delay $\tau_i$ from the node i to the node i+1 via a virtual channel or path, the cell k arrives at an arrival time $AT_{i+1,j}^k$ at the node i+1 and, then, the cell k is temporally stored at the jitter controller of the node i+1 for a holding time $HT_{i+1,j}^k$ wherein the holding time $HT_{i+1,j}^k$ at the node i+1 is equal to the pre-ahead $P_{ij}^k$ at the node i. An eligible time $ET_{i+1,j}^k$ at which the cell k becomes eligible for transmission at the node i+1 is the sum of the arrival time $AT_{i+1,j}^k$ and the holding time $HT_{i+1,j}^k$ at the node i+1. The jitter controller thus absorbs delay variations by holding the cell k for the amount of time by which the cell k has left the node i ahead of its deadline $DL_{ij}^k$ to prevent the burstiness from permeating into the network.

Meanwhile, the cell k in the node i+1 is served at a service time $ST_{i+1,j}^k$ before its deadline $DL_{i+1,j}^k$ with scheduling information for a time stamp, e.g., a pre-ahead $PA_{i+1,j}^k$ wherein the deadline $DL_{i+1,j}^k$ is equal to the sum of the eligible time $ET_{i+1,j}^k$ and a delay bound $d_{i+1,j}$; and the pre-ahead $PA_{i+1,j}^k$ is equal to a time difference between its deadline $DL_{i+1,j}^k$ and the service time $ST_{i+1,j}^k$ at the node i+1.

In other words, the eligible time $ET_{i+1,j}^k$ of the cell k at the node i+1 of the connection j is calculated as follows:

$$ET_{i+1,j}^k = ET_{ij}^k + d_{ij} + \tau_i$$

wherein $ET_{ij}^k$ and $ET_{i+1,j}^k$ represent eligible times of the cell k at the upstream node i and the downstream node i+1 of the connection j, respectively; $d_{ij}$ the delay bound at the upstream node i of the connection j; and $\tau_i$ propagation delay between the upstream node i and the downstream node i+1. Between two neighboring nodes, the upstream and the downstream nodes are positioned toward a source and a destination nodes, respectively. Since the eligible time of the cell k at the downstream node i+1 depends on its eligible time at the upstream node i, information for the upstream node i must be sent to the downstream node i+1. Such information would be written in the cell header in some existing algorithms.

Therefore, the existing non-work-conserving packet service disciplines are not suitable for application to the ATM networks in their current forms, because they control delay jitter either by employing the framing strategy or by delivering scheduling information using the packet header. The former cannot meet the diverse performance requirements of connection efficiently due to its intrinsic coupling problem, and the latter requires an extra header space to transmit scheduling information on the time stamps, which is hardly admissible in the ATM network.

SUMMARY OF THE INVENTION

It is, therefore, a primary object of the invention to provide a method and apparatus capable of providing a guaranteed end-to-end delay and delay-jitter without occupying an extra header space for transmitting the scheduling information from an upstream node to a downstream node to schedule cells with real-time congestion-free communication services in an ATM network.

In accordance with the present invention, there is provided a method for scheduling a plurality of cells of a call via a connection linking a multiplicity of nodes which include a source node and a destination node, each of the nodes of the connection having a frame counter, the method comprising the steps of:

(a) determining a frame size for the call, wherein the frame size is composed of an M number of time slots with M being a positive integer, each of the time slot being of a preset time interval;

(b) detecting each propagation delay and each delay bound between two nodes of each neighboring node pair, each neighboring node pair including an upstream node positioned toward the source node and a downstream node located toward the destination node, wherein the propagation delay represents a number of time slots during the propagation of a cell and the delay bound represents P number of time slots before which a cell must be served to the downstream node after becoming eligible for transmission at the upstream node, with P being a positive integer;

(c) synchronizing the frame counters of all the nodes of the connection based on the propagation delays and the delay bounds, wherein each frame counter counts down the time slots of each frame to be reset to the frame size and each upstream count of the frame counter in the upstream node is correlated to a downstream count of the frame counter in the downstream node;

(d) holding said each cell, after the arrival of each cell at an upstream node of a neighboring node pair, until the upstream count is reset to the frame size of the frame at which said each cell arrives so that said each cell may become eligible for transmission;

(e) transmitting each eligible cell from the upstream node to its corresponding downstream node before an upstream count of the frame counter in the upstream node is reset to the frame size of the frame; and (f) repeating said steps (d) and (e) for each of the remaining neighboring node pairs until said each cell reaches the destination node.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
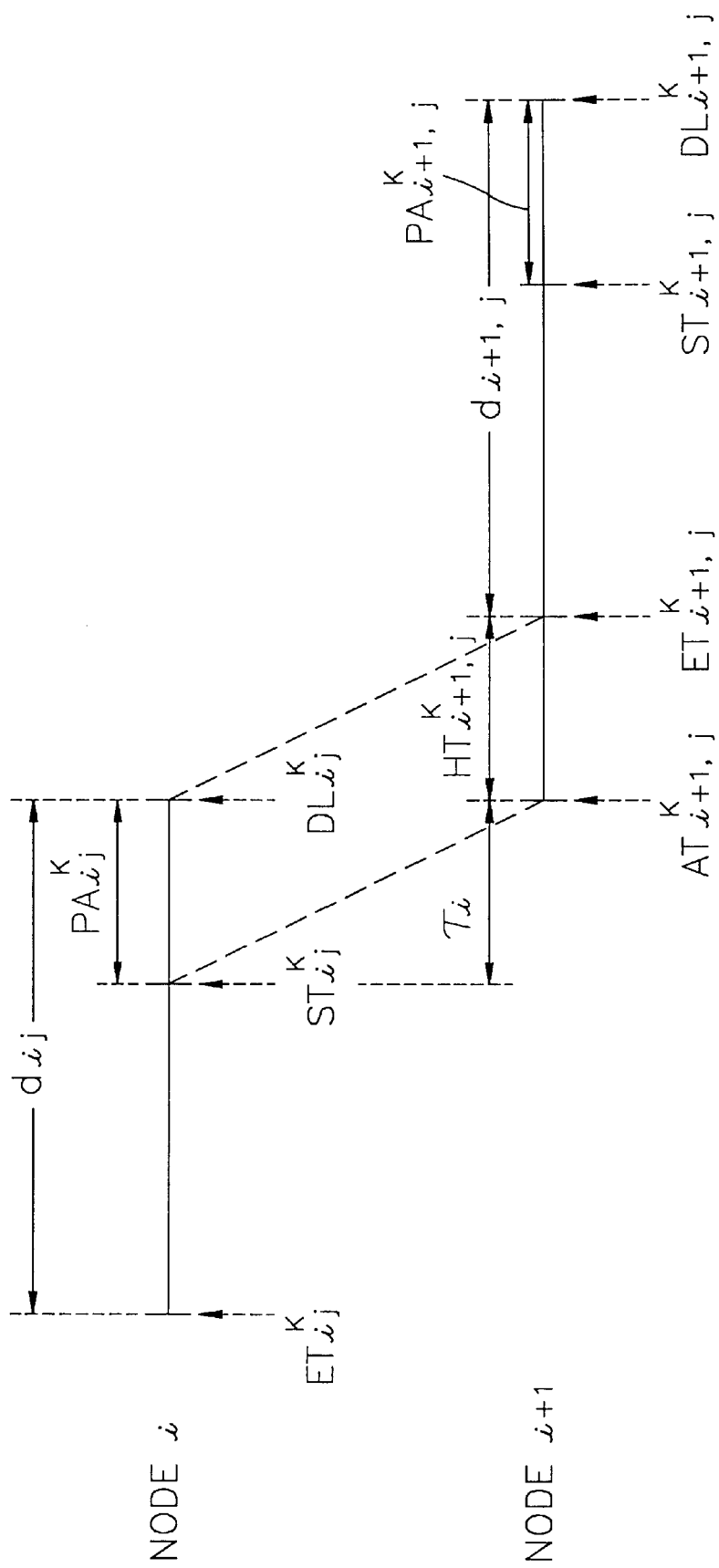
FIG. 1 illustrates a conventional jitter earliest-due-date (jitter-EDD) principle.
Figure 2:
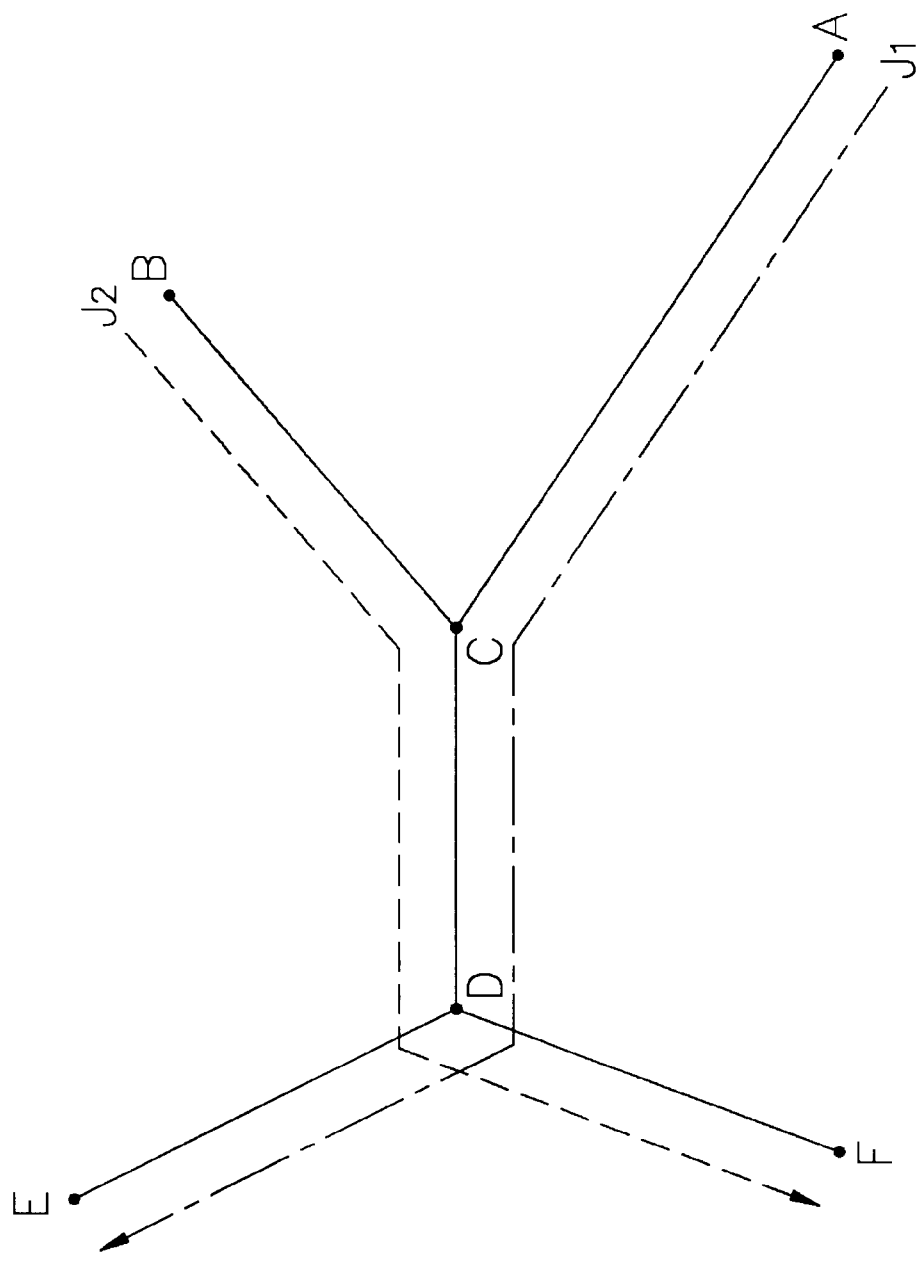
FIG. 2 demonstrates an exemplary diagram of a network which is composed of a plurality of nodes.

Referring to FIG. 2, there is shown a communication model in accordance with the present invention, wherein the network is composed of a set of nodes connected by a set of links. Each unidirectional link allows two neighboring nodes to communicate through a bandwidth. The set of links that a packet or cell k of a connection j traverses in going from a source node to a destination node through a plurality of nodes is called a path of the packet. The two neighboring nodes of said each link includes an upstream node positioned toward the source node and a downstream node located toward the destination node. There are two connections in FIG. 2; one connection $j_1$, following a path $P_1=\{AC, CD, DE\}$; and the other connection $j_2$, following a path $P_2=\{BC, CD, DF\}$. For the link CD, the set of connections which use the link CD is $\{j_1, j_2\}$.

In accordance with the present invention, there is provided a new queuing strategy suitable for real-time communication services, which provides congestion-free communications with guaranteed throughput and almost constant end-to-end delay. The queuing strategy of the present invention uses a per-session pre-synchronized(PSPS) framing strategy: Each of frames of a connection is defined per session by a frame counter at each node, and the boundaries of the frames are aligned through pre-synchronization of the frame counters at a call setup stage. These synchronized frame counters can efficiently control the delay-jitter without requiring header spaces for delivering the scheduling information. Therefore the PSPS framing strategy can be directly applied to the ATM network, rendering an attractive solution for the transmission of time-critical information, e.g., real-time communication signals such as voice, video, and circuit emulation, in the ATM network.

Figure 3:
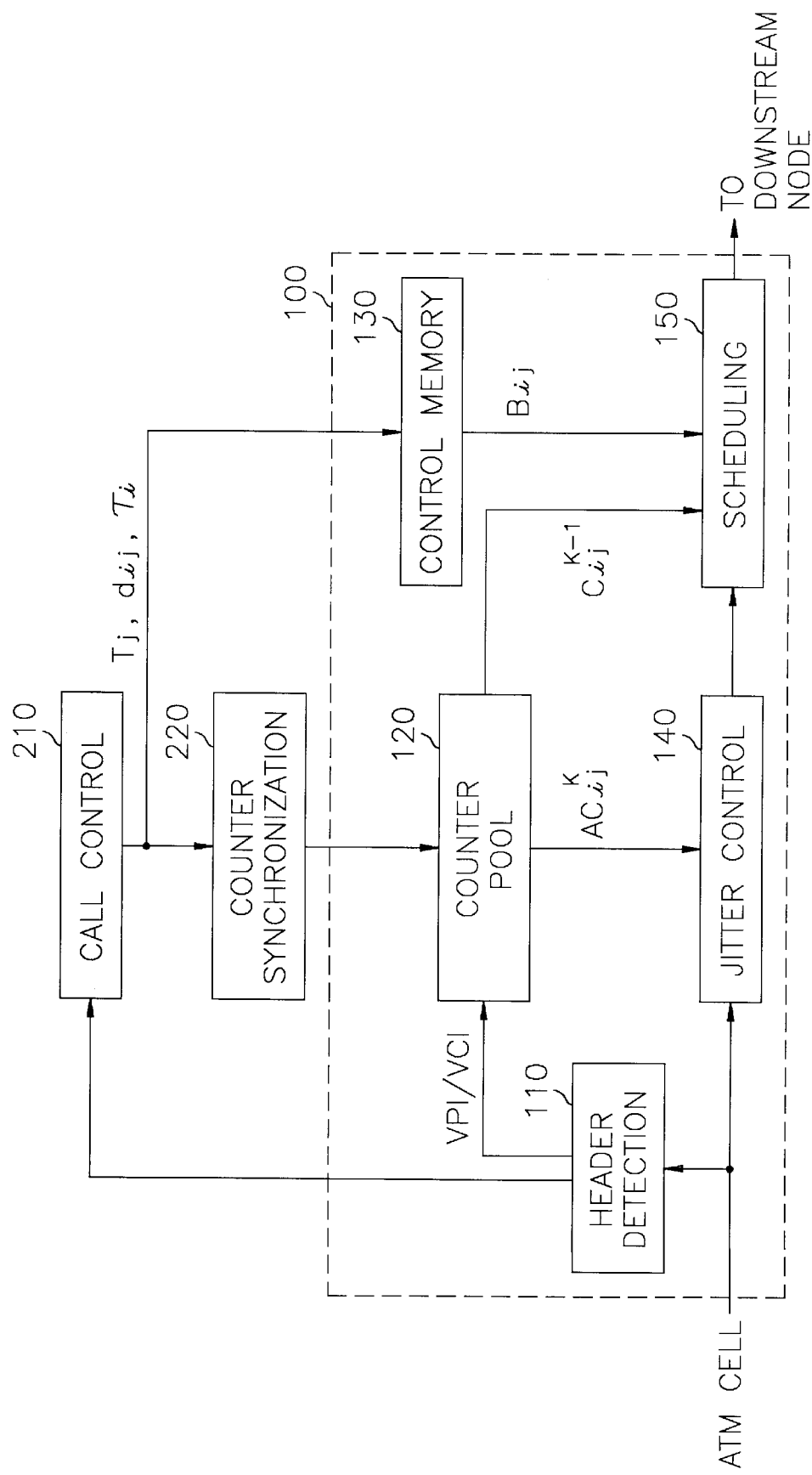
FIG. 3 describes a block diagram of an apparatus for setting up a call and transmitting the cells in accordance with the present invention.

Referring to FIG. 3, there is described an apparatus for setting up a connection for a call and transmitting the cells in accordance with the present invention. An transmitted ATM cell is provided to a header detection block 110 and a jitter control block 140.

At a call setup stage, the header detection block 110 detects a 5-octet header of the ATM cell and determines whether or not a connection for a call of the ATM cell has been set up. If there exists no call for the ATM cell, a process for setting up a connection for a call will be initiated based on header information in a call control block 210, wherein the header information of the ATM cell includes a generic flow-control field(GFC) in 4 bits, a virtual path identifier (VPI) in 8 bits, a virtual channel identifier(VCI) in 16 bits, a payload type(PT) in 3 bits, a cell loss priority(CLP) in 1 bit and a header error control(HEC) in 8 bits. The GFC field is to be used for an end-to-end flow control and could be used to control the flow of several different kinds of data; the VPI indicates a user-to-user or a user-to-network virtual path; the VCI depicts a user-to-user or a user-to-network virtual channel; and the PT represents the type of information in the information field. The call control block 210 determines which network resources are needed to provide a quality of service(QOS) requested by a connection, checks if those resources are available, and then reserves those resources. The resources that need to be reserved are primarily a buffer space at each node and a bandwidth for each link along the connection's path. If a connection is not acceptable to the requested QOS, another connection may be selected to renegotiate at a lower QOS. For example, the call control block 210 can extends an end-to-end deadline, relaxes a jitter requirement, or decreases a peak traffic rate or a permissible burst size. Information on the selected connection j is provided to a counter synchronization block 220 and a control memory 130, wherein the information includes a frame size $T_j$, each delay bound $d_{ij}$ between a upstream node i and a downstream node i+1 of the connection j, and each propagation delay $\tau_i$ between the upstream node i and the downstream node i+1; and $T_j$, $d_{ij}$ and $\tau_i$ are represented on a time slot basis, respectively.

In the preferred embodiments of the present invention, all frame counters at all nodes of the connection j are pre-synchronized in the counter synchronization block 220. The counter synchronization block 220 initializes a corresponding frame counter of the connection j in a counter pool 120 shown in FIG. 3.

For the PSPS framing strategy, frame boundaries of each neighboring nodes pair should'be aligned in such a manner that the scheduling information of the upstream node, e.g., node i can be delivered to the downstream node, e.g., node i+1 effectively. The aligning procedure may be proceeded backward during setting up a connection for a call as follows. The destination node activates its frame counter and sends a count from the frame counter of the destination node to the neighboring upstream node. On receiving the count, the neighboring upstream node initializes the frame counter corresponding to the connection for the call with a value that reflects the relevant propagation delay. The procedure repeats for each neighboring node pair while propagating upstream until the source node is reached.

When this initialization process is completed, the frame counter counts down at the rate of time slot and is reset to the frame size $T_j$ as soon as the frame counter reaches '0', wherein $T_j$ is a positive integer. Once the frame counters in a connection are synchronized as described above at the call setup stage, each frame counter may operate independently throughout the connection duration.

From another point of view, the frame counters are pre-synchronized on the basis of each connection such that the eligible time of a cell at each node can be determined without delivering the scheduling information from one node to another. To be more specific, an arrival count $AC_{i+1,j}^k$ of the frame counter at the downstream node i+1 of the connection j satisfies a following equation:

$$ET_{i+1,j}^k = ET_{ij}^k + d_{ij} + \tau_i = AT_{i+1,j}^k + AC_{i+1,j}^k$$

wherein $ET_{ij}^k$ denotes an eligible time of a cell k of the connection j at the upstream node i, i.e., a virtual arrival time after which the cell k at the upstream node i may be delivered to the downstream node i+1; $d_{ij}$ a delay bound of the connection j between the upstream node i and the downstream node i+1; $\tau_i$ a propagation delay between the upstream node i and the downstream node i+1; $AT_{i+1,j}^k$ an actual arrival time of the cell k at the downstream node i+1 of the connection j; and $AC_{i+1,j}^k$ an arrival count computed just by reading out the corresponding frame counter at the actual arrival time $AT_{i+1,j}^k$ of the cell k at the downstream node i+1 of the connection j.

As a result, the eligible time $ET_{i+1,j}^k$ of the cell k at the downstream node i+1 of the connection j is calculated as the sum of the actual arrival time $AT_{i+1,j}^k$ of the cell k at the downstream node i+1 of the connection j and the arrival count $AC_{i+1,j}^k$ of the frame counter at the actual arrival time $AT_{i+1,j}^k$ since the arrival count $AC_{i+1,j}^k$ for the cell k also represents a remaining time(RT) till the eligible time $ET_{i+1,j}^k$ at the downstream node i+1 of the connection j.

A frame counter per each node of the connection j is assigned and all frame counters for all the nodes of the connection j are pre-synchronized in accordance with the persession pre-synchronization process as mentioned above. Each count of all the frame counters is decreased by one at each time slot, or each service time, and is reset to a frame size $T_j$ of the connection j as soon as each count of all the frame counters becomes '0'. To be more specific, all the frame counters located in all the nodes of the connection j are pre-synchronized by taking account of propagation delay between two neighboring nodes, so that, if a cell departs from the upstream node i at a count number N, the cell will see the same count number N at the downstream node i+1 after a time amounting to the propagation delay in the transmission thereof. This arrangement can be made by sending information on the frame counter to the corresponding neighboring node at the call setup stage. The resulting per-session pre-synchronized frame counters remain synchronous throughout the corresponding connection.

The count of the frame counter at the node i has two meanings: each count for each of the cells in the jitter-controller at the node i represents a remaining time till the eligible time, after which the cell can be served by a predetermined scheduling discipline; and each count for each of the cells in the scheduler at the node i represents another remaining time till the deadline, before which the cell must be served. For example, if a cell is served when the count of the frame counter at the upstream node is 3, it means that the cell is served at 3 time slots before its deadline. When the cell arrives at the downstream node, the count of the frame counter at the downstream node of the connection will also be 3 and, therefore, the cell enters the scheduler after being held 3 time slots in the jitter-controller. From the scheduler's point of view, the cell at the downstream node looks as if it has experienced the maximum delay bound at the upstream node. That is, the instance when a cell enters the scheduler at the downstream node is constant regardless of the service time of the cell at the upstream node.

The implementation described above does not require to compute the eligible time and the deadline of a cell, and does not need any storage to record them. It needs only synchronized frame counters to control the delay jitter and determine the scheduling priority. The synchronized frame counters operate not based on which a cell have arrived or departed in the current time slot, but based on the cell transmission events of the output link.

The synchronized frame counters play the central role to control the delay jitter efficiently without requiring any header space for delivering the scheduling information, thereby rendering an attractive solution for the real-time applications in the ATM network.

Referring back to FIG. 3, in a cell transmission stage, if the ATM cell is determined to correspond to a call among a plurality of calls by detecting the 5-octet header of the ATM cell at the header detection 110, information for the VPI/VCI of the 5-octet header is delivered to the counter pool 120. A block 100 indicated with a dotted line in FIG. 3 represents a cell transmission block at a node i of the connection j. In the counter pool 120, a corresponding synchronized frame counter at the node i of the connection j is detected to read an arrival count $AC_{ij}^k$ of the cell k based on the information for the VPI/VCI and, then, the arrival count $AC_{ij}^k$ is delivered to a jitter control block 140. The cell k is temporally stored at the jitter control block 140 for the arrival count $AC_{ij}^k$ to be eligible for transmission and, then, is delivered to a scheduling block 150.

Meanwhile, the counter pool 120 provides a count $C_{ij}^{k-1}$ for the synchronized frame counter to a scheduling block 150 on a time slot basis, wherein the count $C_{ij}^{k-1}$ is a count for an previous cell k−1 eligible for transmission at the upstream node i of the connection j, and the control memory 130 delivers a difference $b_{ij}$ of the frame size $T_j$ and the delay bound $d_{ij}$ to the scheduling block 150. The scheduling block 150 serves the previous cell k−1 with a departure count $DC_{ij}^{k-1}$ to the downstream node i+1 in accordance with the present invention, wherein the departure count $DC_{ij}^{k-1}$ represents a count of the frame counter of the upstream node i when the previous cell k−1 is served to the downstream node i+1.

Figure 4:
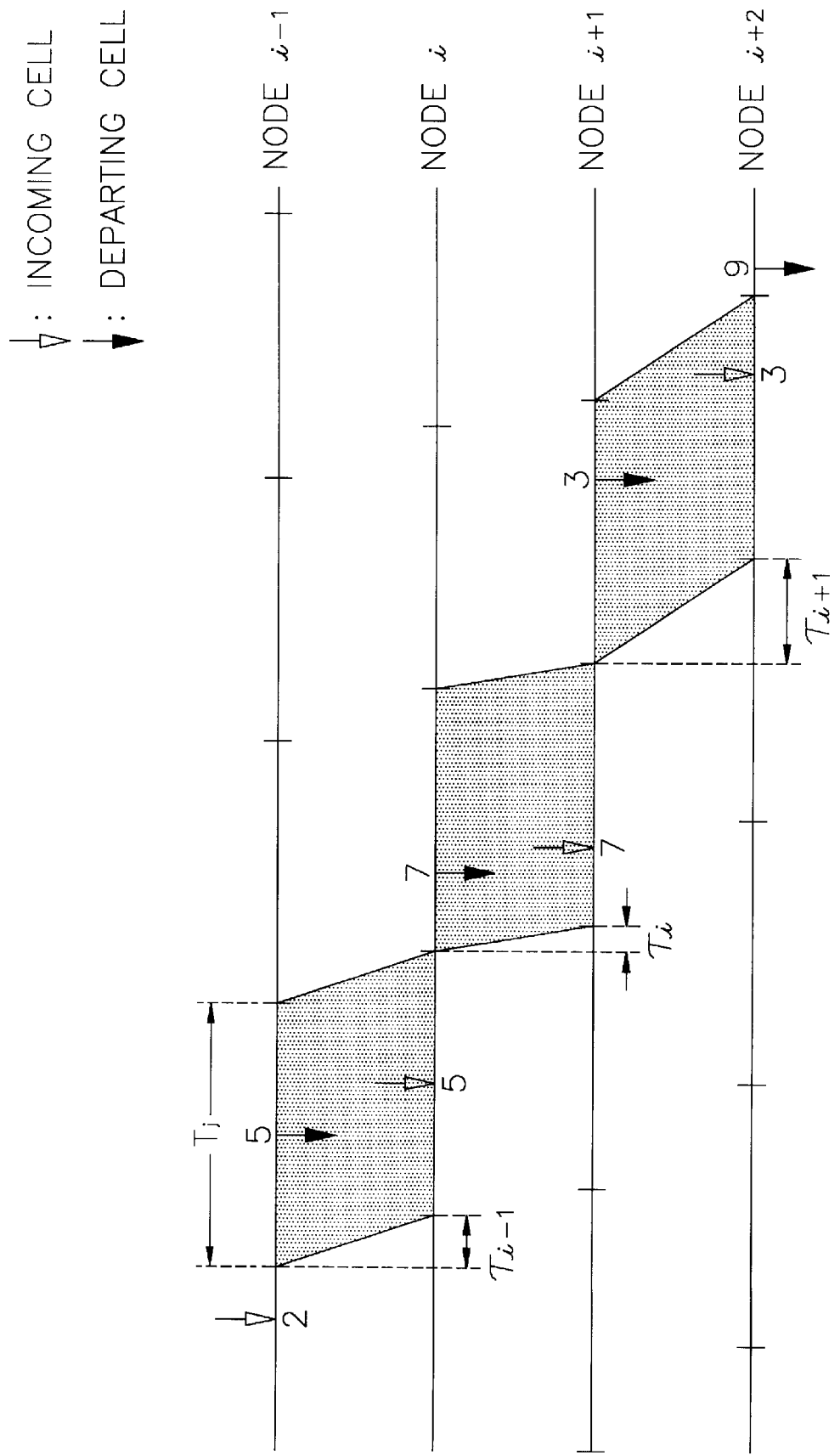
FIG. 4 represents a first embodiment of per-session pre-synchronization (PSPS) among counters at the call setup stage with delay bounds of a frame size in accordance with the present invention.

Referring to FIG. 4, there is illustrated a transmission of a cell via 4 nodes by using each of frame counters pre-synchronized by PSPS technique with delay bounds of a frame size $T_j$ of a connection j. Each white arrow represents actual arrival of a cell at the corresponding node, while each black arrow represents departure of the cell from the corresponding node to the next node. If a cell k actually arrives at an arrival count $AC_{i-1,j}^k=2$ at the node i−1, the cell k is held or temporally stored at the jitter-controller of the node i−1 for the arrival count $AC_{i-1,j}^k=1$ to be eligible for transmission into the next node i. Since each arrival count $AC_{ij}^k$ for a downstream node i lags by a propagation delay $\tau_{i-1}$ behind each corresponding departure count $DC_{i-1,j}^k$ for an upstream node i−1 in accordance with the PSPS technique, if the cell k leaves the upstream node i−1 at a departure count $DC_{i-1,j}^k$ an arrival count $AC_{ij}^k$ must be '5' when the cell k arrives at the node i. Then the cell k is held for the arrival count $AC_{ij}^k=5$ at the node i to be eligible for transmission and, then, is transmitted to the next node i+1 at a departure count $DC_{ij}^k=7$, and so on.

Meanwhile, in a general framing strategy, the delay bound at each node is given by the frame size of the corresponding connection, and the frame size is determined as the inverse of the bandwidth allocated to the corresponding connection. Accordingly, the allocation of the bandwidth is coupled with the delay bound, resulting in inefficient utilization of network resources. This inefficiency can be alleviated by decoupling the delay bound allocation from the bandwidth allocation.

Figure 5:
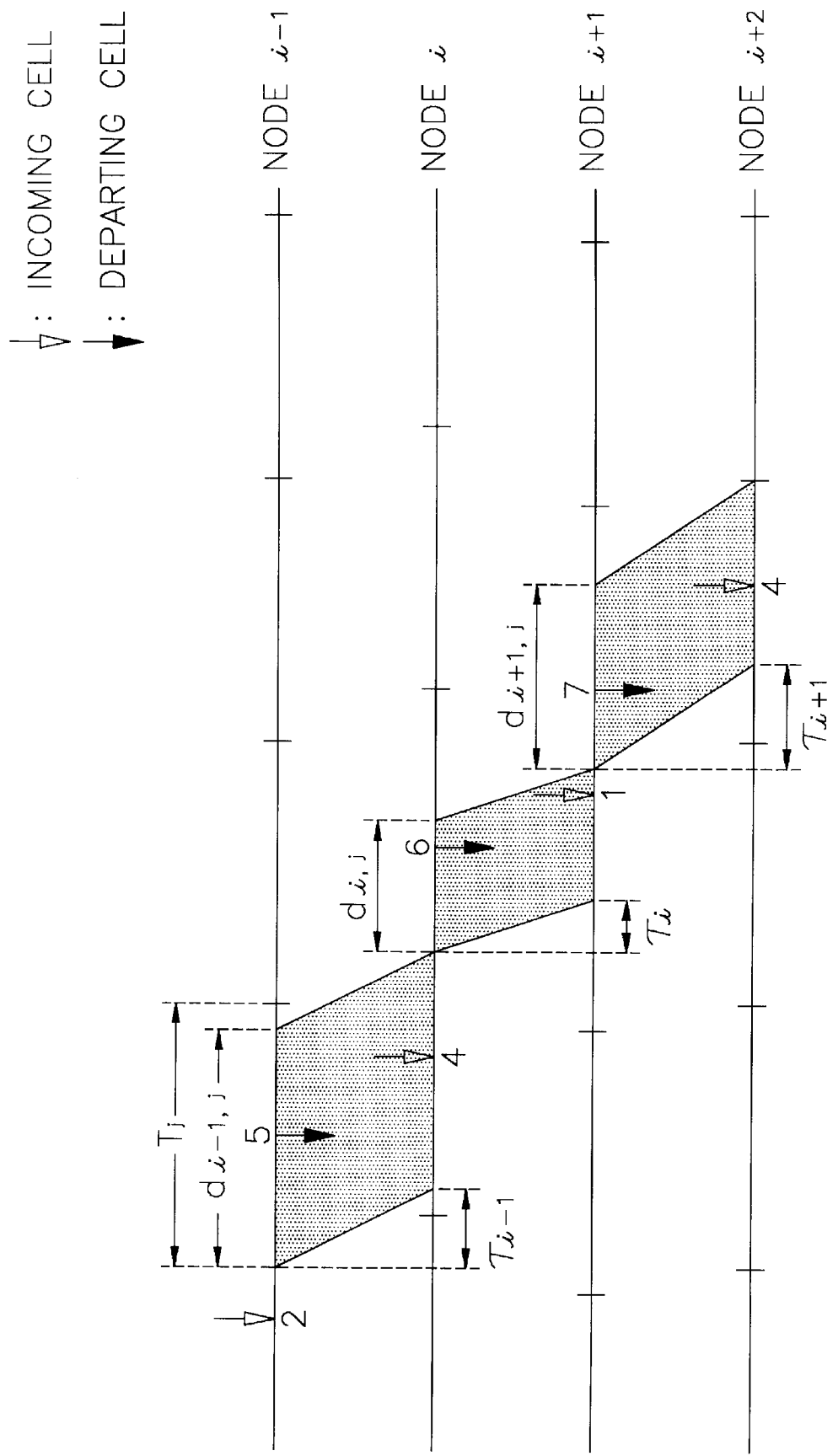
FIG. 5 depicts a second embodiment of per-session pre-synchronization among counters at the call setup stage with delay bounds of smaller than a frame size in accordance with the present invention.

Referring to FIG. 5, there is depicted a transmission of a cell k with delay bounds $d_{i+1,j}$ smaller than the frame size $T_j$, which serves as an example for decoupling the bandwidth allocation from the delay bound. A deadline of the cell k at a node i of a connection j with an eligible time $ET_{ij}^k$ becomes $ET_{ij}^k+d_{ij}$, not $ET_{ij}^k+T_j$, wherein $d_{ij}$ is a delay bound at the node i of the connection j and $T_j$ is a frame size of the connection j. Each frame counter at each node of the connection j is also pre-synchronized so that, if there is a departure count $DC_{i-1,k}^j$ of the cell k at the upstream node i−1 of the connection j, then the cell k arrives at the downstream node i of the connection j to read an arrival count $AC_{ij}^k$ as follows:

$$AC_{ij}^k = DC_{i-1,j}^k - (T_j - d_{i-1,j})$$

When each of the frame counters is pre-synchronized, a propagation delay $\tau_{i-1}$ between two neighboring nodes, a delay bound $d_{i-1,j}$ of each node i−1 of the connection j and a frame size $T_j$ of the connection j must be taken into account, so that each arrival count $AC_{ij}^k$ for a downstream node i lags by $\tau_{i-1}-(T_j-d_{i-1,j})$ behind each corresponding departure count $DC_{i-1,j}^k$ for a upstream node i−1 in accordance with the PSPS technique.

Assume that a frame size $T_j$ of a connection j is '10' and delay bounds $d_{i-1,j}$, $d_{ij}$ and $d_{i+1,j}$ at nodes i−1 , of the connection j are '9', '5' and '7', respectively. If a cell k leaves the node i−1 at a departure count $DC_{i-1,j}^k=5$, an arrival count $AC_{ij}^k$ when the cell k arrives at the node i must be '4'(=5−(10−9)). Then the cell k is held for the arrival count $AC_{ij}^k=4$ to be eligible for transmission and may be transmitted to the node i+1 at a departure count $DC_{ij}^k=6$ to see that the arrival count $AC_{i+1,j}^k$ at the node i+1 is '1'(= 6−(10−5)), and so on. The eligible time of the cell k can be determined just by reading out the corresponding frame counter at the arrival time of the cell k to the node i.

Since the present invention employs per-session frames, it can overcome the coupling problem which is inherent to the framing strategy. Moreover, it can decouple the delay bound from the bandwidth by adjusting the frame size and the service quanta and by synchronizing each of the frame counters with an offset corresponding to each delay bound, thereby providing a flexible allocation of the network resources.

Figure 6:
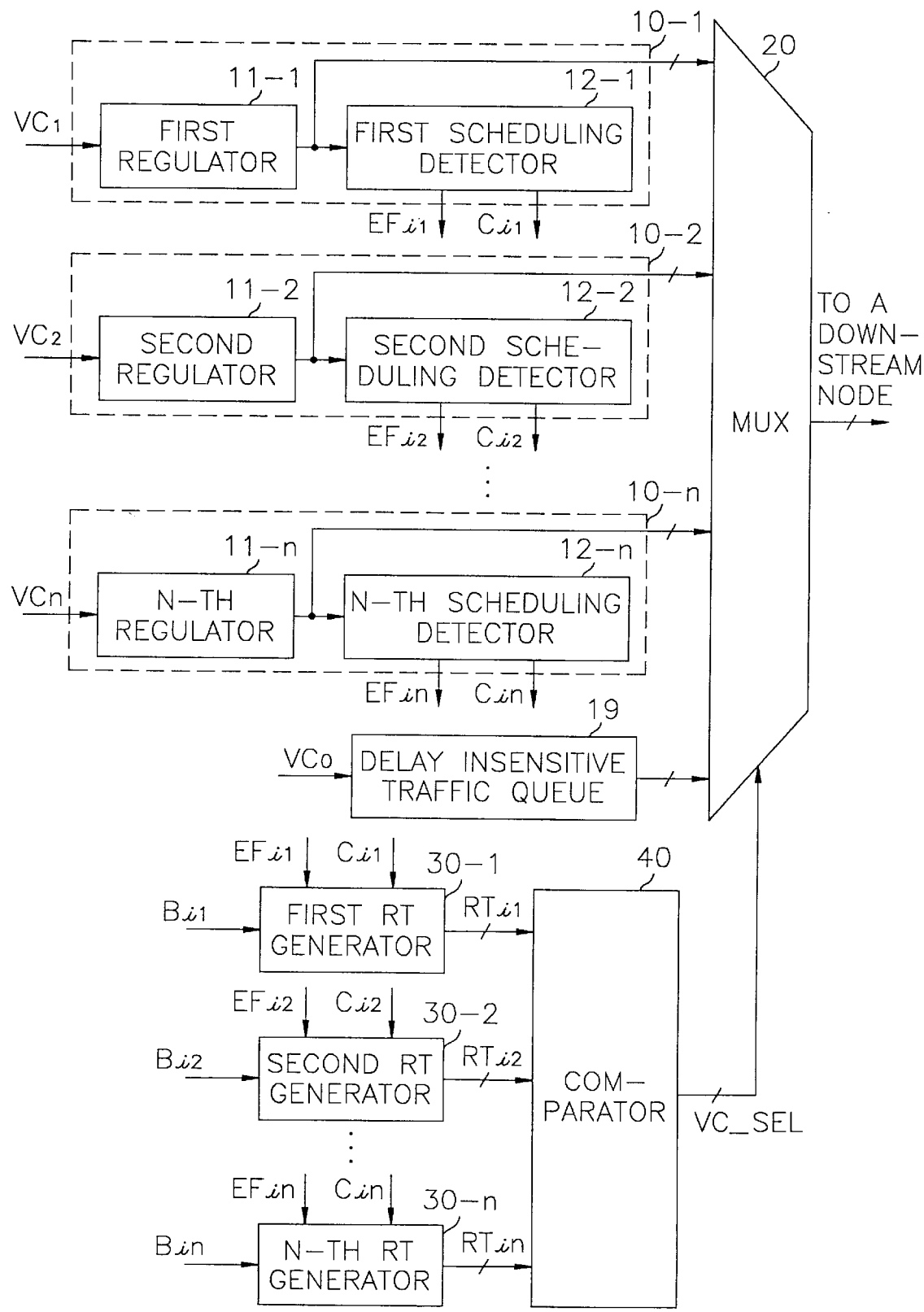
FIG. 6 shows a block diagram of an apparatus for regulating and scheduling cells with a PSPS dynamic priority queuing discipline for n+1 number of connections at the node i in accordance with the present invention.

FIG. 6 shows a block diagram of an apparatus for regulating and scheduling cells with a PSPS dynamic priority queuing discipline for n+1 number of connections at the node i in accordance with the present invention. Assume that there are n channels for bounded delay traffics and one channel for delay insensitive traffic at the node i. The apparatus includes n number of bounded delay traffic queues 10-1 to 10-n for real-time service, one delay insensitive traffic queue 19, a multiplexor(MUX) 20, n number of remaining time(RT) generators 30-1 to 30-n and a comparator 40.

Each of the bounded delay traffic queues 10-1 to 10-n has a corresponding regulator, i.e., one of jitter controllers 11-1 to 11-n and a corresponding one of scheduling detectors 12-1 to 12-n. Each of the regulators 11-1 to 11-n admits input cells belonging to a specific connection among 1 to n via a corresponding one of the virtual channels $VC_1$ to $VC_n$, holds the cells till corresponding eligible times, and then passes the cells to the MUX 20 and a corresponding one of the scheduling detectors 12-1 to 12-n, wherein all the connections 1 to n pass through an upstream node i and its downstream node (i+1) and the eligible time for a cell refers to an ending time of a frame that contains the cell. Each of the scheduling detectors 12-1 to 12-n checks the pre-synchronized frame counter to read a count $C_{ij}$ which decreases on a time slot basis and to generate an empty flag $EF_{ij}$, wherein the empty flag $EF_{ij}$ represents whether or not there exists a cell for transmission. Not only each count $C_{ij}$ and each empty flag $EF_{ij}$ from the corresponding scheduling detector 12-j but also the difference $B_{ij}$ of the frame size T and the delay bound $d_{ij}$ from the control memory 130 shown in FIG. 3 are provided to each corresponding one of the remaining time (RT) generators 30-1 to 30-n, wherein j is a positive integer equal to or smaller than n. Each RT generator 30-j generates a remaining time $RT_{ij}$ based on the count $C_{ij}$, the empty flag $EF_{ij}$ and the difference $B_{ij}$, wherein the remaining time $RT_{ij}$ refers to an ending time of a delay bound for the cell measured from the eligible time.

Figure 7:
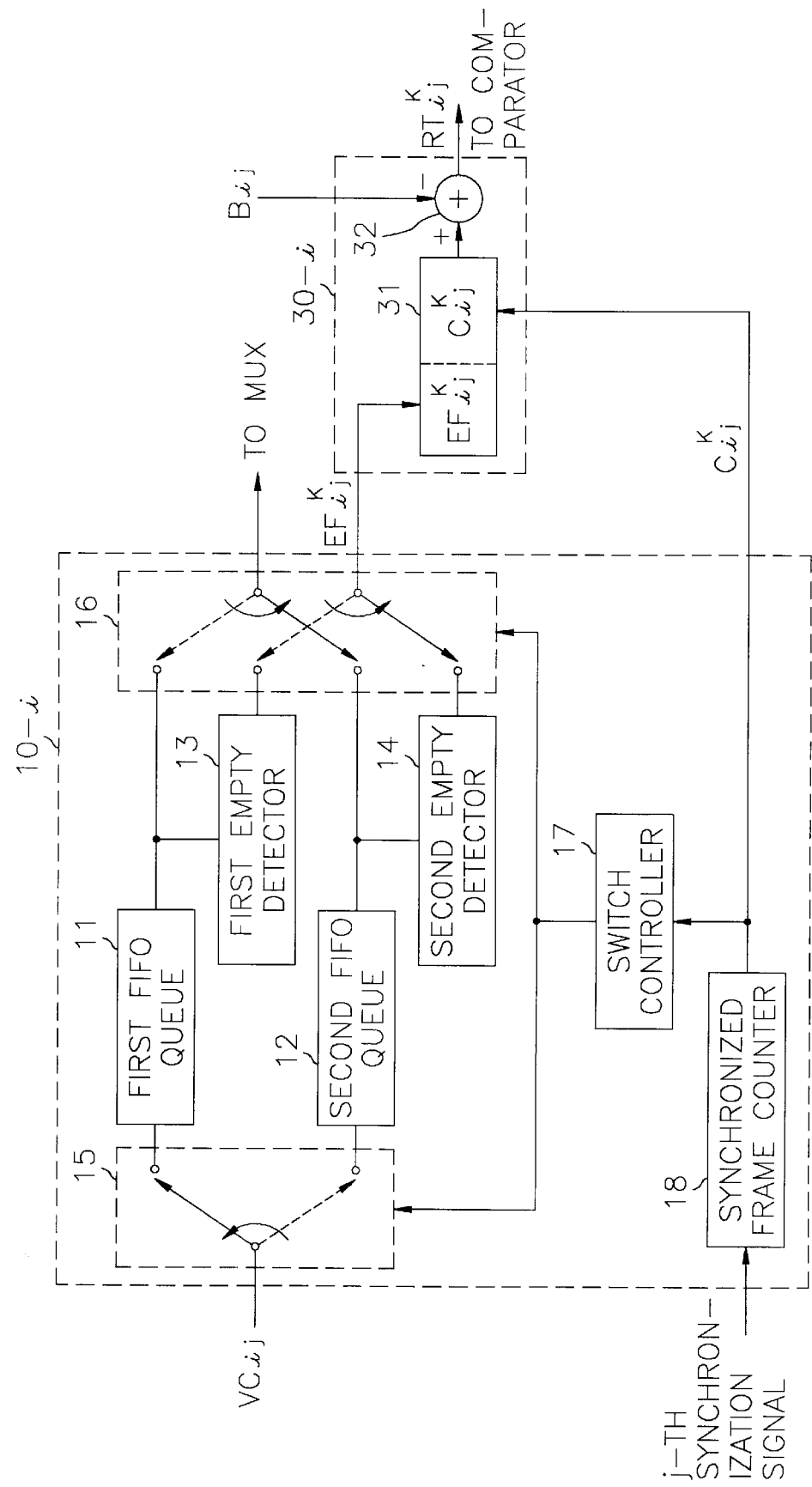
FIG. 7 presents a block diagram of j-th bounded delay traffic queue and j-th remaining time(RT) generator for connection j in FIG. 6.

Referring to FIG. 7, there is illustrated a block diagram of jth bounded delay traffic queue and jth remaining time (RT) generator for each real-time connection j shown in FIG. 6. The jth bounded delay traffic queue includes a first and a second FIFO(first input first out) queues 11 and 12, a first and a second empty detectors 13 and 14, an input and an output toggle switches 15 and 16, a switch controller 17 and a synchronized frame counter 18.

First of all, the synchronized frame counter 18 for the node i of the connection j is pre-synchronized by a synchronization signal in accordance with the PSPS process as mentioned above, wherein the synchronization signal fed from the counter synchronization block 220 shown in FIG. 3 takes account of a propagation delay $\tau_i$ between two neighboring nodes i and i+1, a delay bound $d_{ij}$ at each node i of the connection j and a frame size $T_j$ of the connection j; and each count of the frame counter 18 at the node i is decreased by one at each time slot, or each service time, and is reset to a frame size $T_j$ of the connection j as soon as the count becomes '0'. Whenever said each count is decreased, said each count is provided to the switch controller 17 and an extended counter 31. When said each count is reset to a frame size $T_j$, the switch controller 17 generates a switching signal so that the switching signal with a period of the frame size $T_j$ is provided to the input and the output switches 15 and 16.

Meanwhile, in the input switch 15, a virtual channel $VC_{ij}$ for the node i of the connection j is alternately coupled to the first and the second FIFO(first-in first-out) queues 11 and 12 in response to the switching signal fed from the switch controller 17. Also, in the output switch 16, if an input of the first FIFO queue 11 is connected to the virtual channel $VC_{ij}$ as shown in a solid arrow in FIG. 7 in response to the switching signal, then an output of the second FIFO queue 12 is connected to the MUX 20. On the other hand, if an input of the second FIFO queue 12 is connected as shown in a dotted arrow in FIG. 7, then an output of the first FIFO queue 11 is connected to the MUX 20. In other words, the first and the second FIFO queues 11 and 12 are logically separated so that one FIFO queue stores an eligible cell ready to be scheduled for transmission while the other FIFO queue stores a cell that won't be eligible, i.e., be jitter-controlled till the end of the frame time.

Outputs of the first and the second FIFO queues 11 and 12 are also connected to the first and the second empty detectors 13 and 14, respectively, so that the first and the second empty detectors 13 and 14 detect whether or not the first and the second FIFO queues 11 and 12 are empty, i.e., there exists a cell for transmission in the first and the second FIFO queues 11 and 12, respectively. If a cell has already been transmitted by a scheduling discipline or if no cell has been inputted to be jitter-controlled to the corresponding FIFO queue from an upstream node, then an empty flag $EF_{ij}$='1' is provided to a prefix of the extended counter 31 and, if there exists a cell for transmitting in the corresponding FIFO queue, then an empty flag $EF_{ij}$='0' is provided. Needless to say, in the output switch 16, if the first FIFO queue 11 is coupled with the MUX 20, then the empty flag $EF_{ij}$ of the first empty detector 13 may be provided to the prefix of the extended counter 31 in response to the switching signal; and, if the second FIFO queue 12 is coupled with the MUX 20, then the empty flag $EF_{ij}$ of the second empty detector 14 may be provided to the prefix of the extended counter 31.

The extended counter 31 stores the empty flag $EF_{ij}$ and the count $C_{ij}^k$. The count $C_{ij}^k$ fed from the synchronized frame counter 18 is decreased by one at each time slot and is reset to the frame size $T_j$ with being '0' so that the count $C_{ij}^k$ swaps with a period of the frame size $T_j$. The empty flag $EF_{ij}^k$ of one bit '0' or '1' is preferably prefixed to the count $C_{ij}^k$ in the extended counter 31 to generate an extended count $EC_{ij}^k$ so that an empty queue with an empty flag $EF_{ij}^k=1$ has a lower priority than any other queues that contain eligible cells. In a subtractor 32, the difference $B_{ij}$ of the frame size $T_j$ and the delay bound $d_{ij}$ is subtracted from the extended count $EC_{ij}^k$ to generate a remaining time $RT_{ij}^k$ of the cell k at the node i of the connection j, wherein the remaining time $RT_{ij}^k$ is a time remaining till the deadline of the cell in the queue. The remaining time $RT_{ij}^k$ is provided to the comparator 40.

Referring back to FIG. 6, the comparator 40 compares all the remaining times $RT_{ij}^k$'s for all the connections j's every slot time; selects a smallest remaining time $RT_{ij}^k$ with the corresponding connection j; and generates a virtual channel selection signal VC_SEL corresponding to the smallest remaining time $RT_{ij}^k$. The comparator 40 could be complicated because it is involved with all connections passing through a node and has to perform the comparison functions in one time slot. If the comparator 40 can also be arranged as a multistage structure of two input comparators, the comparison operation has the complexity of $\lceil \log M \rceil$ for the number of connections M, wherein $\lceil \; \rceil$ denotes an operator that takes a smallest integer greater than or equal to its operand. However, since what is concerned is the number of connections, not the number of total cells, it does not cause much difficulty. For example, we consider an ATM network that has 1 Gbps link bandwidth and the minimum connection rate of 64 kbps. Since the maximum number of the connections in the worst case is about M=15,625, it is possible to determine the cell to its deadline in 14 comparison operations. In order to preform this operation within one time slot, e.g., 424 ns(nanosecond), it should be capable of comparing two 15-bit words in 30 ns or so, which is well within the range of the capability of the current available technology. This example demonstrates that the comparison function is no barrier to the implementation of the PSPS service discipline.

The VC_SEL signal shown in FIG. 6 is provided to the multiplexor 20. The multiplexor 20 transmits the cell k, which corresponds to the VC_SEL signal, to a next node i+1 by putting out a connection identifier (CID) for the cell data stored in the corresponding queue. In case all the queues for real-time connections are empty, i.e., all the empty flag's $EF_{ij}$'s are '1' so that there is no cell for transmission, a delay insensitive cell from the delay insensitive traffic queue 19 for the non-real-time connection may be selected to be provided to the MUX 20.

Figure 8:
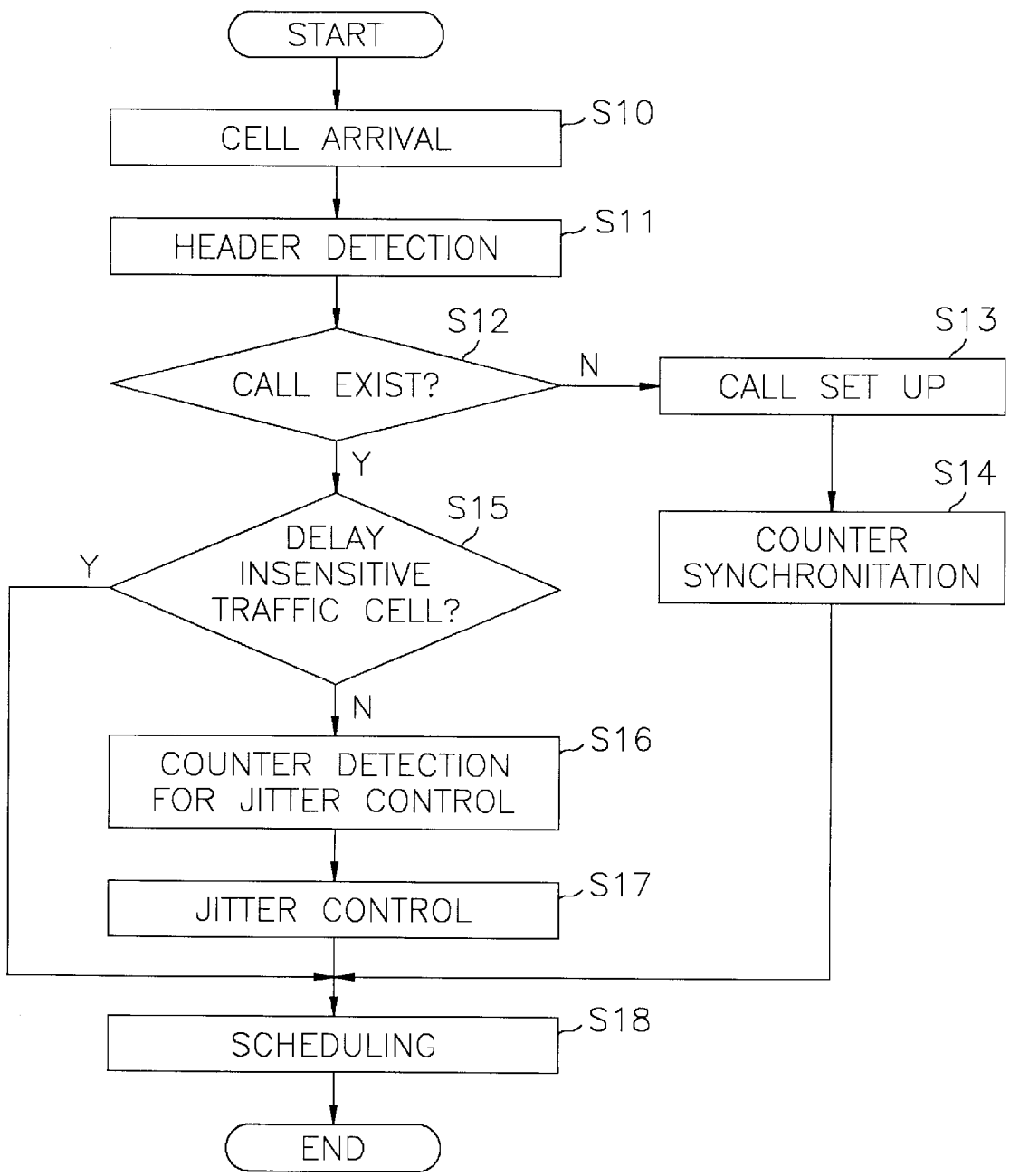
FIG. 8 shows a flow chart regarding a dynamic priority queuing discipline based on per-session pre-synchronization (PSPS) frames generated by using frame counters in an ATM system in accordance with the present invention.

FIG. 8 shows a flow chart regarding a dynamic priority queuing discipline of a cell k at a node i of a connection j based on PSPS frames generated by using frame counters in an ATM system in accordance with the present invention. If an ATM cell arrives at step S10, a header of the cell is detected at step S11 and it is checked at step S12 whether there is a call for the ATM cell. If there is no call for the ATM cell, a connection j of a call for the ATM cell is set up through a number of nodes at step S13 and each counter located in each of the nodes is pre-synchronized on a connection basis by the use of PSPS technique in accordance with the present invention at step S14. Then the cell is scheduled to be transmitted at step S18.

Meanwhile, if there is a call for the ATM cell, it is checked at step S15 whether the cell conforms to a delay insensitive traffic. If the cell is delay insensitive, then the cell is directly scheduled to be transmitted at step S18. If otherwise, an arrival count $AC_{ij}^k$ for the cell k at the node i of the connection j from the synchronized frame counter is detected for a jitter control at step S16 so that the cell k is jitter-controlled for the arrival count $AC_{ij}^k$ at step S17 and, then, the cell is scheduled to be transmitted at step S18.

Figure 9:
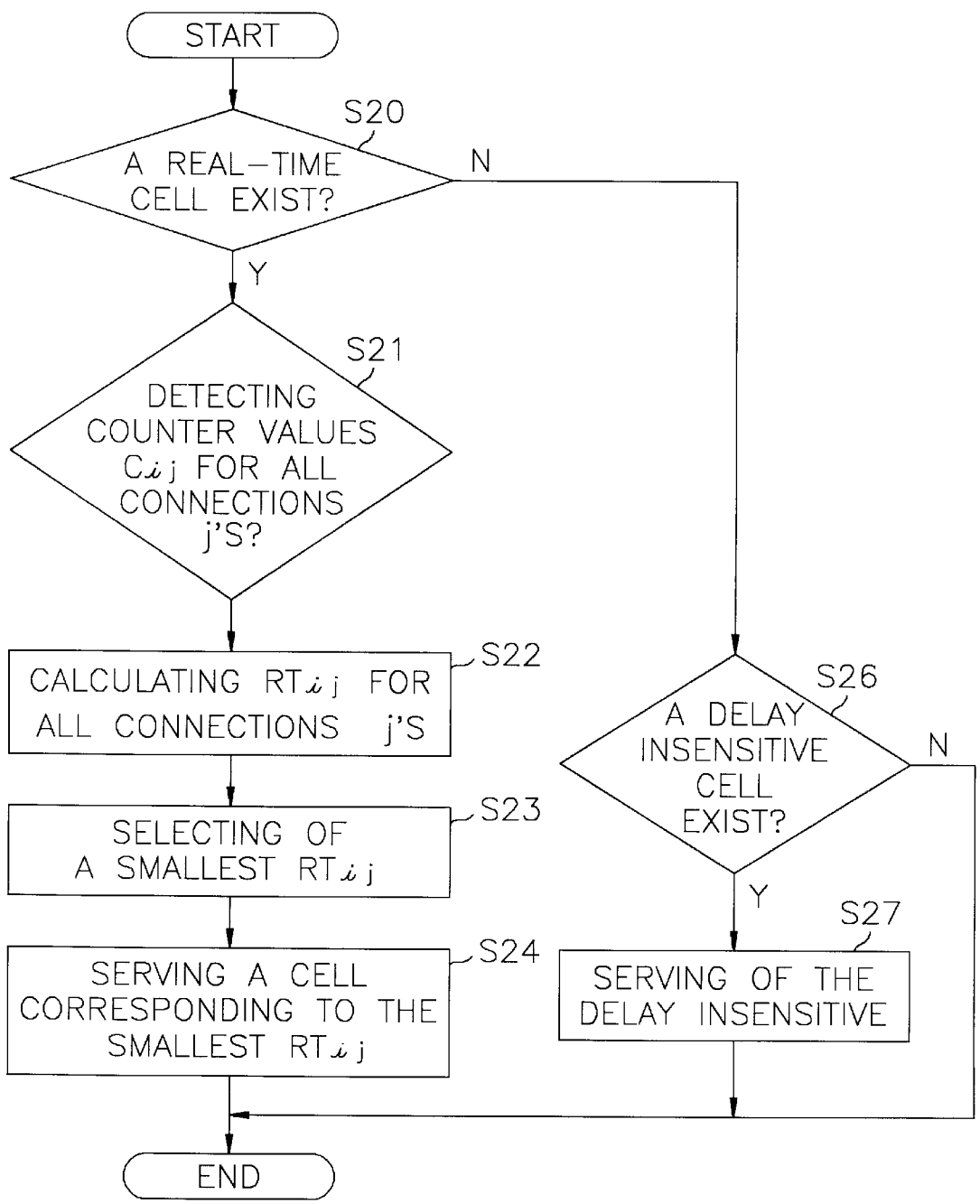
FIG. 9 represents a flow chart regarding the scheduling step of FIG. 8 which uses the synchronized frame counters of all real-time connections.

Referring to FIG. 9, there is illustrated a flow chart regarding the scheduling step for all cells of all connections at a node, wherein each synchronized frame counter is assigned to each of all real-time connections. The procedure starts at step S20, wherein all connections are checked that there are one or more real-time cells.

If there exists no real-time cell, i.e., no delay-bound cell, it is checked at step S26 whether or not there is a delay insensitive cell, wherein the delivery time of each delay insensitive cell is insignificant. If it is checked that there exists a delay insensitive cell, then at step S27, the delay insensitive cell is served to a next node i+1. If otherwise, there is no cell served at the time slot.

If one or more real-time cells are detected at step S20, since each real-time connection at the node i has a synchronized frame counter, the counts $C_{ij}^k$'s are detected at step S21 for all the connections j's having one or more real-time cells for transmission. At step S22, the remaining times $RT_{ij}^k$ for all connections j's are calculated based on the count $C_{ij}^k$, the frame size $T_j$ and the delay bounds $d_{ij}$; at step S23, a smallest remaining time $RT_{ij}^k$ is selected; and, at step S24, a cell corresponding to the smallest remaining time $RT_{ij}^k$ is served to a next node i+1.

Figure 10:
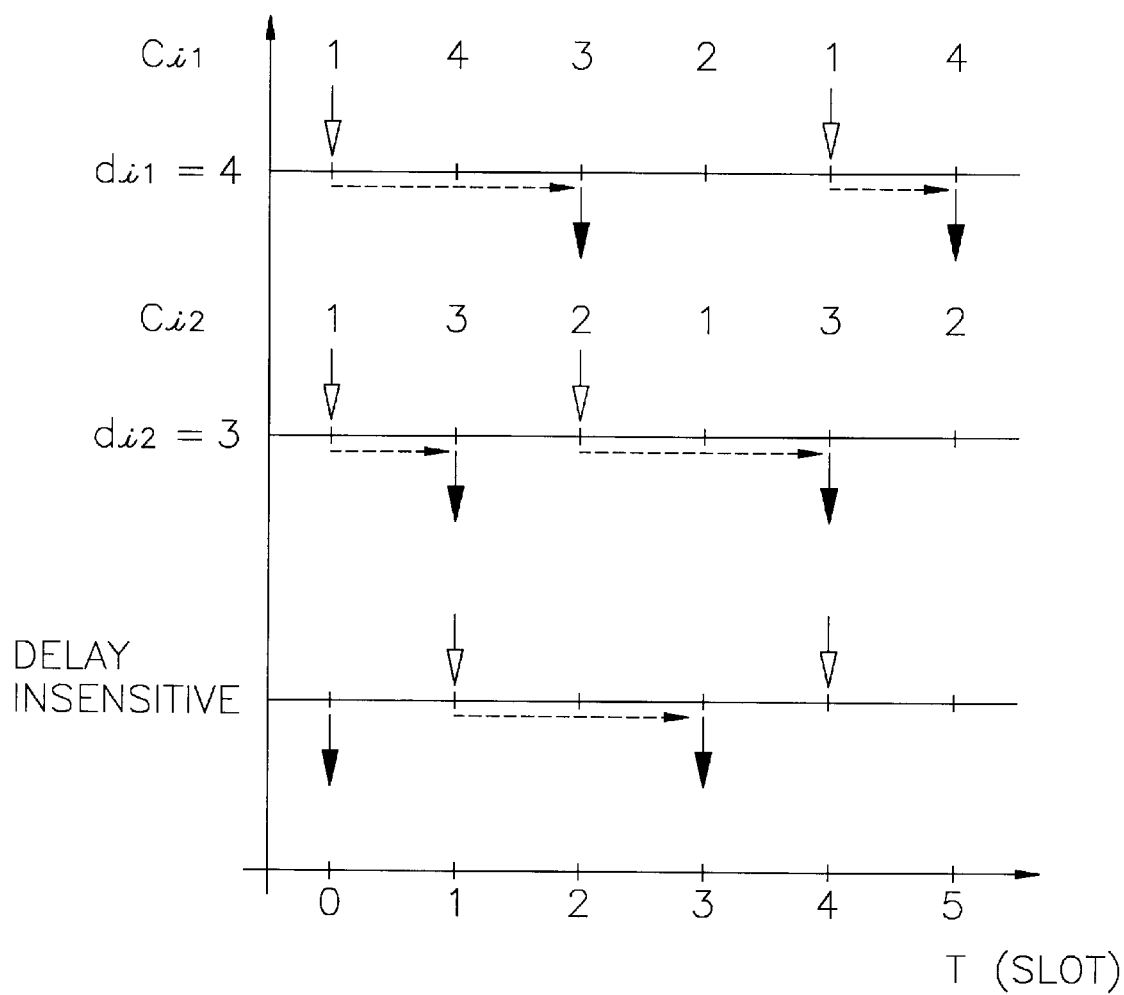
FIG. 10 is an exemplary scheduling table for two delay bound connections and one delay insensitive connection at a node i.

Referring to FIG. 10, there is illustrated an exemplary scheduling table for two delay bound connections and one delay insensitive connection at a node i, wherein delay bounds for a first and a second connection j=1 and j=2 are $d_{i1}=4$ and $d_{i2}=3$, respectively, and a third connection j=3 is delay insensitive. Assume that time varies on a time slot basis. A cell $k_1$ of the connection 1 which arrives with an arrival count $AC_{i1}^k=1$ at time slot '0' has been jitter-controlled for 1 time slot so that the cell $k_1$ is eligible for transmission at a time slot '1'; and a cell $k_2$ of the connection 2 which arrives with an arrival count $AC_{i2}^k=1$ at time clock '0' has also been jitter-controlled for 1 time slot to be eligible.

At the time slot '1', after the counts $C_{i1}^k=4$ of the connection 1 and $C_{i2}^k=3$ of the connections 2 are compared with each other, a smallest count '3' is selected so that the cell $k_2$ of the connection 2 is served to the next node i+1 with a departure count $DC_{i2}^k=3$. Also a cell $k_3$ of the connection 3 arrives at the time slot '1'. At time slot '2', since the connection 2 has no cell to be transmitted, an empty flag $EF_{i2}^k='1'$ for the connection 2 is generated, while the cell $k_1$ of the connection 1 is scheduled to be served to the node i+1 with a departure count $DC_{i1}^k=3$. Another cell $(k+1)_2$ of the connection 2 which arrives with an arrival count $AC_{i2}^{k+1}=2$ is jitter-controlled for 2 time slots to be eligible at slot time '4'. At time slot '3', there is no cell for transmission in the connections 1 and 2, because the cell $k_1$ in the connection 1 has already been transmitted while the $(k+1)_2$ cell in the connection 2 is under jitter-controlling. So the cell $k_3$ in a delay insensitive traffic is scheduled to be transmitted at time slot '3'. At time slot '4', the cell $(k+1)_2$ in the connection 2 is scheduled to be transmitted to the next node i+1 with a departure count $DC_{i2}^{k+1}=3$.

While the present invention has been described with respect to certain preferred embodiments only, other modifications and variations may be made without departing from the spirit and scope of the present invention as set forth in the following claims.

What is claimed is:

1. A method for scheduling a plurality of cells of a call via a connection linking a multiplicity of nodes which include a source node and a destination node, each of the nodes of the connection having a frame counter, the method comprising the steps of:

(a) determining a frame size for the call, wherein the frame size is composed of an M number of time slots with M being a positive integer, each of the time slots being of a preset time interval;

(b) detecting each propagation delay and each delay bound between two nodes of each neighboring node pair, said each neighboring node pair including an upstream node positioned toward the source node and a downstream node located toward the destination node, wherein said each propagation delay represents a number of time slots during which a cell is propagated to the downstream node and said each delay bound represents P number of time slots before which the cell must be served to the downstream node after becoming eligible for transmission at the upstream node, with P being a positive integer;

(c) synchronizing the frame counters of all the nodes of the connection based on the propagation delays and the delay bounds, wherein each frame counter counts down the time slots of each frame to be reset to the frame size and an upstream count counted by the frame counter at the upstream node is correlated to a downstream count counted by the frame counter at the downstream node;

(d) holding each cell, after the arrival of said each cell at the upstream node, until the upstream count is reset to the frame size of the frame at which said each cell arrives so that said each cell becomes eligible for transmission, wherein the arrival of said each cell is identified with an arrival count read from the frame counter at the upstream node on arriving of said each cell at the upstream node, the arrival count representing a remaining time till an eligible time for the transmission after which said each cell is served as an eligible cell by a predetermined scheduling discipline;

(e) transmitting said eligible cell from the upstream node to the downstream node before the upstream count of the frame counter at the upstream node is reset to the frame size of the frame, wherein the transmission of said eligible cell is identified with a departure count read from the frame counter at the upstream node on transmitting of said eligible cell, the departure count representing another remaining time till the delay bound before which said each eligible cell is served; and (f) repeating said steps (d) and (e) for each of the remaining neighboring node pairs until said each cell reaches the destination node;

wherein the departure count $DC_{ij}^k$ and the arrival count $AC_{i+1,j}^k$ are synchronized with each other as follows:

$$AC_{i+1,j}^k = DC_{ij}^k - (T_j - d_{ij})$$

wherein the departure count $DC_{ij}^k$ represents the upstream count counted by the frame counter at an upstream node i on transmitting of a cell k of a connection j from the upstream node i to the downstream node i+1; the arrival count $AC_{i+1,j}^k$ represents the downstream count counted by the frame counter at a downstream node i+1 on arriving of the cell k of the connection j at the downstream node i+1; $T_j$ a frame size of the connection i; $d_{ij}$ the delay bound between the upstream node i and the downstream node i+1 of the connection j.

2. The method as recited in claim 1, wherein the arrival count $AC_{i+1,j}^k$ further satisfies a following equation:

$$ET_{i+1,j}^k = ET_{ij}^k + d_{ij} + \tau_i = AT_{i+1,j}^k + AC_{i+1,j}^k$$

wherein $ET_{ij}^k$ denotes an eligible time of the cell k of the connection j at the upstream node i, after which the cell k at the upstream node i may be delivered to the downstream node i+1; $d_{ij}$ the delay bound of the connection j between the upstream node i and the downstream node i+1; $\tau_i$ a propagation delay between the upstream node i and the downstream node i+1; and $AT_{i+1,j}^k$ an actual arrival time of the cell k at the downstream node i+1 of the connection j.

3. The method as recited in claim 2, wherein said transmitting step (e) includes the steps of:

(e1) calculating a remaining time for said eligible cell of the connection at the upstream node on a time slot basis, wherein the remaining time represents a number of time slots till the delay bound before which said eligible cell must be served;

(e2) comparing all remaining times of all eligible cells of all connections at the upstream node to select a smallest remaining time among all the remaining times; and (e3) transmitting said eligible cell corresponding to the smallest remaining time on a time slot basis.

4. The method as recited in claim 3, wherein the calculating step (e1) has the steps of:

(e11) generating an empty flag for the connection at the upstream node on a time slot basis, wherein the empty flag represents whether or not there exists said eligible cell to be eligible for transmission;

(e12) obtaining an extended count of the connection on a time slot basis, wherein the extended count is the upstream count prefixed by the empty flag;

(e13) estimating a difference between a frame size of the connection and the delay bound of the connection at the upstream node; and (e14) subtracting the difference from the extended count to generate the remaining time.

5. An apparatus for scheduling a plurality of cells of a call via a connection linking a multiplicity of nodes which include a source node and a destination node, the apparatus comprises:

means for determining a frame size for the call, wherein the frame size is composed of an M number of time slots with M being a positive integer, each of the time slots being of a preset time interval;

means for detecting each propagation delay and each delay bound between two nodes of each neighboring node pair, said each neighboring node pair including an upstream node positioned toward the source node and a downstream node located toward the destination node, wherein said each propagation delay represents a number of time slots during which a cell is propagated to the downstream node and said each delay bound represents P number of time slots before which the cell is to be served to the downstream node after becoming eligible for transmission at the upstream node, with P being a positive integer;

frame counters for generating counts on a time slot basis, wherein a frame counter assigned to each node of the connection is pre-synchronized on a connection basis based on the propagation delays and the delay bounds to count down the time slots of each frame to be reset to the frame size; and an upstream count counted by the frame counter at the upstream node is correlated to a downstream count counted by the frame counter at the downstream node;

switch controller for generating a switching signal with a period of the frame size when a count of the frame counter is reset to the frame size; and synchronized scheduler of the connection for regulating and scheduling cells based on the upstream and the downstream counts of the frame counters and the switching signal, wherein the synchronized scheduler includes logically separated two FIFO(first-in first-out) queues so that one FIFO queue stores an eligible cell ready to be scheduled for transmission and transmits said eligible cell from the upstream node to the downstream node before the upstream count is reset to the frame size of the frame while the other FIFO queue stores non-eligible cell, after the arrival of said non-eligible cell at the downstream node, until the downstream count is reset to the frame size of the frame at which said non-eligible cell arrives; and the transmission of said eligible cell is identified with a departure count read from the frame counter at the upstream node on transmitting of said eligible cell from the upstream node to the downstream node, the departure count representing a remaining time till the delay bound before which said eligible cell is served, while the arrival of said non-eligible cell is identified with an arrival count read from the frame counter at the downstream node on arriving of said non-eligible cell at the downstream node, the arrival count representing another remaining time till an eligible time for the transmission after which said non-eligible cell is served as another eligible cell by a predetermined scheduling discipline;

wherein the departure count $DC_{ij}^k$ and the arrival count $AC_{i+1,j}^k$ are synchronized with each other as follows:

$$AC_{i+1,j}^k = DC_{ij}^k - (T_f - d_{ij})$$

wherein the departure count $DC_{ij}^k$ represents the upstream count counted by the frame counter at an upstream node i on transmitting of a cell k of a connection j from the upstream node i to a downstream node i+1; the arrival count $AC_{i+1,j}^k$ represents the downstream count counted by the frame counter at the downstream node i+1 on arriving of the cell k of the connection j at the downstream node i+1; $T_j$ a frame size of the connection j; $d_{ij}$ the delay bound between the upstream node i and the downstream node i+1 of the connection j.

6. The apparatus as recited in claim 5, wherein the arrival count $AC_{i+1,j}^k$ further satisfies a following equation:

$$ET_{i+1,j}^k = ET_{ij}^k + d_{ij} + \tau_i = AT_{i+1,j}^k + AC_{i+1,j}^k$$

wherein $ET_{ij}^k$ denotes an eligible time of the cell k of the connection j at the upstream node i, after which the cell k at the upstream node i may be delivered to the downstream node i+1; $d_{ij}$ the delay bound of the connection j between the upstream node i and the downstream node i+1; $\tau_i$ propagation delay between the upstream node i and the downstream node i+1; and $AT_{i+1,j}^k$ an actual arrival time of the cell k at the downstream node i+1 of the connection j.

7. The apparatus as recited in claim 6, wherein said synchronized scheduler further includes:

- a calculator for calculating a remaining time for said eligible cell of the connection at the upstream node on a time slot basis, wherein the remaining time represents a number of time slots till the delay bound before which said eligible cell must be served;
- a comparator for comparing remaining times of all eligible cells of the corresponding connections at the upstream node with each other; and
- a selector for selecting a smallest remaining time among all the remaining times to transmit said eligible cell corresponding to the smallest remaining time on a time slot basis.

8. The apparatus as recited in claim 7, wherein said calculator has:

- an empty signal generator for generating an empty signal for the connection at the upstream node on a time slot basis, wherein the empty signal represents whether or not there exists said eligible cell to be eligible for transmission;
- means for saving an extended count of the connection on a time slot basis, wherein the extended count is the upstream count prefixed by said the empty signal;
- means for estimating a difference between a frame size of the connection and the delay bound of the connection at the upstream node; and
- means for subtracting the difference from the extended count to generate the remaining time.

* * * * *